No. 641,993. Patented Jan. 23, 1900.
H. W. OSIEK.
PUMP PLUNGER.
(Application filed May 19, 1899.)
(No Model.)
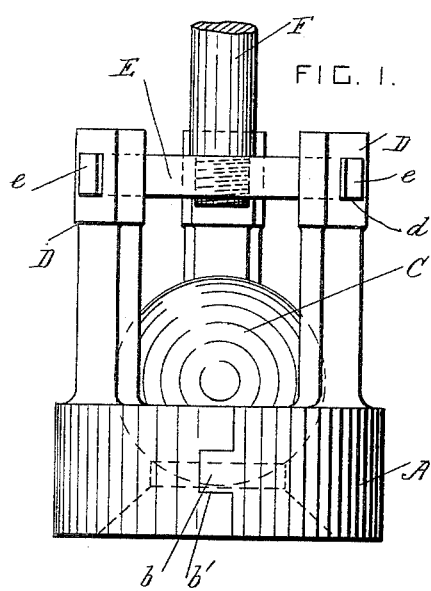
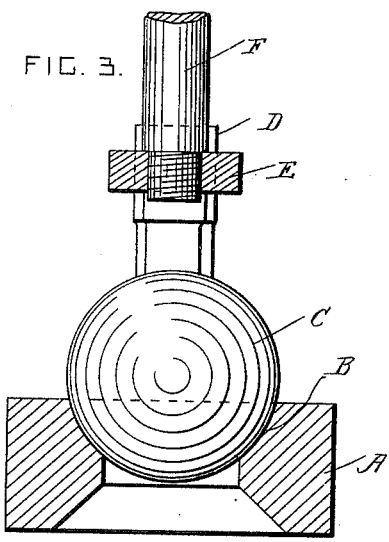
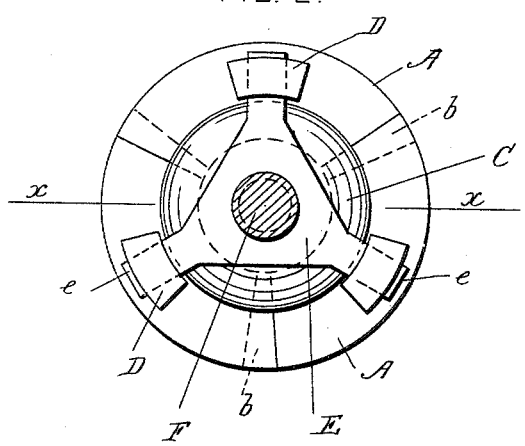
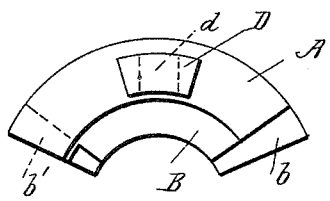
WITNESSES
INVENTOR
Henry W. Osiek
by Herbert W. T. Jenner.
Attorney
THE NORRIS PETERS CO., PHOTO-LITHO., WASHINGTON, D. C.

UNITED STATES PATENT OFFICE.

HENRY W. OSIEK, OF ST. CHARLES, MISSOURI.

PUMP-PLUNGER.

SPECIFICATION forming part of Letters Patent No. 641,993, dated January 23, 1900.

Application filed May 19, 1899. Serial No. 717,441. (No model.)

*To all whom it may concern:*

Be it known that I, HENRY W. OSIEK, a citizen of the United States, residing at St. Charles, in the county of St. Charles and State of Missouri, have invented certain new and useful Improvements in Pump-Plungers; and I do hereby declare the following to be a full, clear, and exact description of the invention, such as will enable others skilled in the art to which it appertains to make and use the same.

This invention relates to pump plungers or buckets; and it consists in the novel construction and combination of the parts hereinafter fully described and claimed.

In the drawings, Figure 1 is a side view of the pump-plunger. Fig. 2 is a plan view of the same. Fig. 3 is a cross-section taken on the line $x\ x$ in Fig. 2. Fig. 4 is a detail plan view of one of the segments.

The body of the plunger is formed of a series of segments A, arranged in circular form and provided with tongues $b$ and grooves $b'$, which interlock and connect the segments, so that they are substantially water-tight, but are free to slide radially. The segments are provided with a depressed or concave valve-seat B, and C is a valve which bears on the said valve-seat. The valve C is preferably a ball-valve; but any other form of valve can be used which will operate to spread or press out the segments when pressed downward upon the valve-seat. Each segment is provided with a vertically-projecting arm or lug D, provided with a slot or hole $d$.

E is a cross-head provided with radially-projecting arms $e$, which engage with the holes $d$, so that the arms D can slide upon the arms $e$.

F is the pump-rod, which is operatively connected to the cross-head in any approved manner.

This pump plunger or bucket does not require any packing. When pressed downward, it slides without friction in the pump-cylinder and the water rises through the valve-seat. When raised, the weight of the water above the valve presses the valve downward and causes it to press the segments of the plunger into substantially water-tight contact with the pump-cylinder.

What I claim is—

1. In a pump-plunger, the combination, with a series of radially-slidable segments provided with a valve-seat, of a valve which spreads the said segments when pressed against the said seat, an arm projecting upward from each said segment, and a pump-rod operatively connected with all the said arms, substantially as set forth.

2. In a pump-plunger, the combination, with a series of radially-slidable segments provided with a valve-seat and interlocking tongues or grooves, of a valve which spreads the said segments when pressed against the said seat, an arm projecting upward from each said segment, and a pump-rod operatively connected with all the said arms, substantially as set forth.

3. In a pump-plunger, the combination, with a series of radially-slidable segments provided with a concave valve-seat, of a ball-valve engaging with the said seat, and operating to spread the said segments, an arm projecting upward from each said segment, said arms forming guides for the said ball-valve, and a pump-rod operatively connected with all the said arms, substantially as set forth.

4. In a pump-plunger, the combination, with a series of radially-slidable segments provided with a valve-seat, each said segment having also a projecting arm, of a cross-head operatively connected with the said arms, and a valve which moves the said segments and arms outwardly when pressed into engagement with the said valve-seat, substantially as set forth.

In testimony whereof I affix my signature in presence of two witnesses.

HENRY W. OSIEK.

Witnesses:
EDW. H. THRO,
EDWD. KISTER.